United States Patent
Jayaseelan et al.

(10) Patent No.: US 10,223,124 B2
(45) Date of Patent: Mar. 5, 2019

(54) THREAD SELECTION AT A PROCESSOR BASED ON BRANCH PREDICTION CONFIDENCE

(71) Applicant: Advanced Micro Devices, Inc., Sunnyvale, CA (US)

(72) Inventors: Ramkumar Jayaseelan, Austin, TX (US); Ravindra N Bhargava, Austin, TX (US)

(73) Assignee: Advanced Micro Devices, Inc., Santa Clara, CA (US)

( * ) Notice: Subject to any disclaimer, the term of this patent is extended or adjusted under 35 U.S.C. 154(b) by 1397 days.

(21) Appl. No.: 13/739,161

(22) Filed: Jan. 11, 2013

(65) Prior Publication Data

US 2014/0201507 A1    Jul. 17, 2014

(51) Int. Cl.
*G06F 9/00* (2006.01)
*G06F 9/38* (2018.01)

(52) U.S. Cl.
CPC .......... *G06F 9/3844* (2013.01); *G06F 9/3851* (2013.01); *G06F 9/3848* (2013.01)

(58) Field of Classification Search
CPC ............................. G06F 9/3851; G06F 9/3848
See application file for complete search history.

(56) References Cited

U.S. PATENT DOCUMENTS

| | | | | |
|---|---|---|---|---|
| 2009/0193231 A1* | 7/2009 | Gschwind | ............. | G06F 9/3804 712/205 |
| 2012/0260252 A1* | 10/2012 | Kuesel | .................. | G06F 9/4881 718/102 |
| 2013/0007423 A1* | 1/2013 | Burcea | .................. | G06F 9/3851 712/239 |

* cited by examiner

*Primary Examiner* — Zachary K Huson

(57) ABSTRACT

A processor employs one or more branch predictors to issue branch predictions for each thread executing at an instruction pipeline. Based on the branch predictions, the processor determines a branch prediction confidence for each of the executing threads, whereby a lower confidence level indicates a smaller likelihood that the corresponding thread will actually take the predicted branch. Because speculative execution of an untaken branch wastes resources of the instruction pipeline, the processor prioritizes threads associated with a higher confidence level for selection at the stages of the instruction pipeline.

22 Claims, 6 Drawing Sheets

THREAD SELECTION AT A PROCESSOR BASED ON BRANCH PREDICTION CONFIDENCE

FIELD OF THE DISCLOSURE

The present disclosure relates generally to processors and more particularly to thread selection at processor.

BACKGROUND

To enhance performance, a processor can employ multi-threading whereby one or more executing programs are separated into multiple threads that are executed at an instruction pipeline of the processor. To further enhance performance, the processor can be configured so that the multiple threads can share one or more stages of the instruction pipeline. For each cycle of the instruction pipeline each of the shared units individually selects one of the multiple threads for processing according to a fixed selection scheme, such as a round robin scheme. However, such a fixed selection scheme can be inefficient when the multiple threads have differing needs for processor resources.

BRIEF DESCRIPTION OF THE DRAWINGS

The present disclosure may be better understood, and its numerous features and advantages made apparent to those skilled in the art by referencing the accompanying drawings.

The use of the same reference symbols in different drawings indicates similar or identical items.

DETAILED DESCRIPTION

Figure 1:
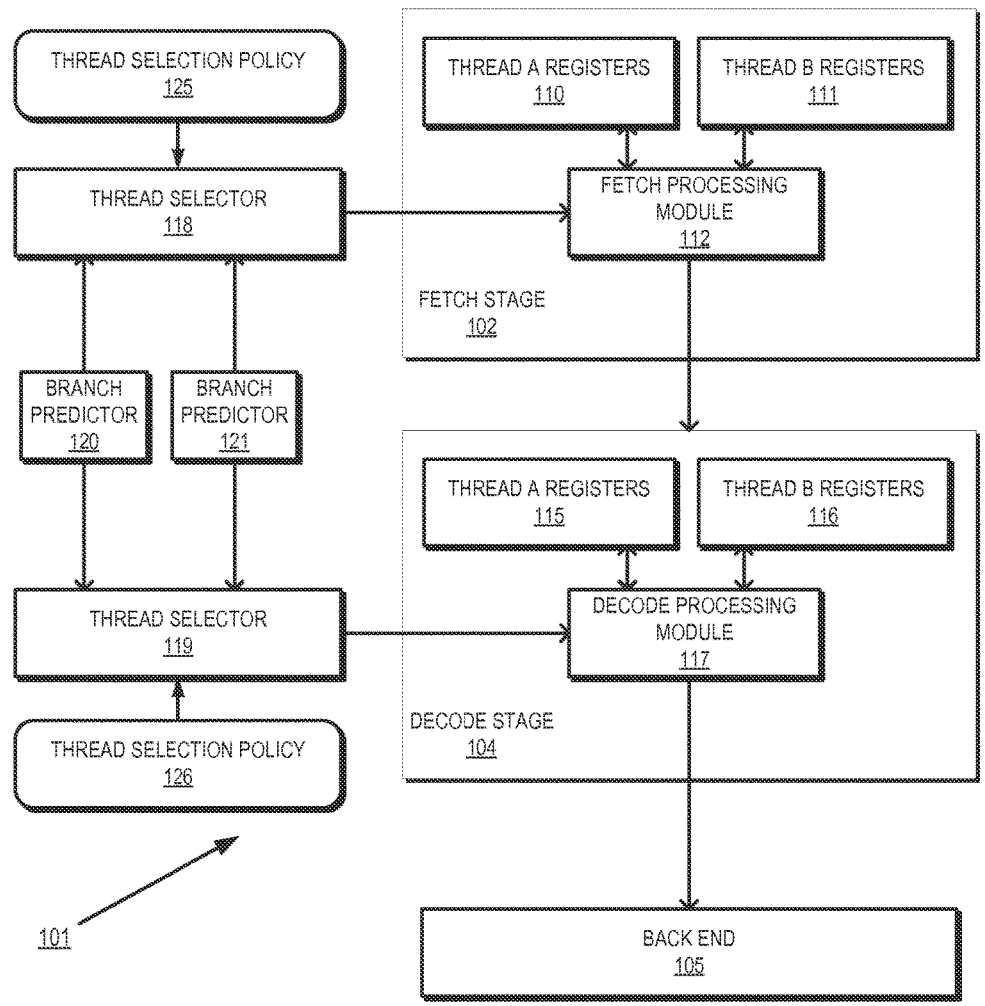
FIG. 1 is a block diagram of a processor in accordance with some embodiments.

FIGS. 1-7 illustrate example techniques for reducing inefficiency and power consumption at an instruction pipeline of a processor by selecting the thread to be executed at one or more shared stages of the instruction pipeline based upon branch prediction confidences corresponding to a set of executing threads. The processor employs one or more branch predictors to issue branch predictions for each thread, whereby a branch prediction initiates speculative processing of instructions for the thread at the instruction pipeline. Based on the branch predictions, the processor determines a branch prediction confidence for each of the executing threads, whereby a lower confidence level indicates a smaller likelihood that the corresponding thread will actually take the predicted branch. Because speculative execution of an untaken branch wastes resources of the instruction pipeline, the processor prioritizes threads associated with a higher confidence level for selection at the stages of the instruction pipeline. This results in more processor cycles at the shared stages being committed to threads associated with a higher branch confidence, improving processing efficiency and reducing power consumption.

To illustrate using an example, the instruction pipeline can include a fetch stage that is shared between two executing threads, designated Thread A and Thread B. The branch predictors issue branch predictions for each of Thread A and Thread B, and based on these predictions, the processor determines a branch confidence for each thread, as described further herein. When the branch prediction confidences for each thread are equal, indicating that the predicted branches for each thread are equally likely to be taken, the threads are selected for processing at the fetch stage in a round robin fashion. In particular, for each cycle of the instruction pipeline the fetch stage alternates between Thread A and Thread B, expressed as follows: ABABABAB. When the branch prediction confidence for Thread A is higher than for Thread B, the processor selects Thread A for processing at the fetch stage more often; for example, Thread A can be selected for two-thirds of the instruction pipeline cycles, expressed as follows: AABAABAAB. Similarly, when the branch prediction confidence for Thread B is higher than Thread A, the processor selects Thread B for processing more often, expressed as ABBABBABB. Thus, the thread having the higher branch prediction confidence, and therefore more likely to be providing instructions that perform useful work for the processor, is selected for processing more often, thereby enhancing processor efficiency.

As used herein, a branch prediction confidence for a thread refers to a predicted likelihood that the conditions for a branch, as indicated by a corresponding branch instruction, will be satisfied and the branch is therefore taken. The processor can determine the branch prediction confidence for each thread in a variety of ways. In some embodiments, a branch predictor will provide a value indicative of the confidence level for a particular branch, and the processor will use the provided value to determine the branch prediction confidence, either directly or by combining the value with other confidence values for other branches. If, for example, a given branch prediction depends on other pending branch predictions, the processor can combine the confidence values for each of the branch predictions to determine an overall branch prediction confidence for the corresponding thread.

In some embodiments, the processor employs multiple branch predictors to predict branches for each executing thread and determines the branch prediction confidence for a thread based on the degree of agreement between the multiple branch predictors in their predictions for that thread. Thus, for example, if the processor employs two branch predictors and they both predict a given branch to be taken for the thread, the processor can assign a relatively high branch prediction confidence to the thread. If one of the branch predictors predicts a branch to be taken when the other predicts the branch is not taken, the processor can assign a relatively low branch prediction confidence.

FIG. 1 illustrates a block diagram of a processor 100 that employs branch prediction confidence to select threads for execution at an instruction pipeline 101 in accordance with some embodiments. The instruction pipeline 101 includes a fetch stage 102, a decode stage 104, and a back end 105. The back end 105 includes additional instruction pipeline stages, such as a dispatch stage, execution stages, and a retire stage. The instruction pipeline 101 is synchronized, based on one or more clock signals (not shown) such that each stage processes received instruction information and outputs resulting instructions information according to a unit of time referred to herein as a cycle. Thus, for example, for each cycle the fetch stage 102 retrieves instruction information from an instruction buffer (not shown) and provides the retrieved information to the decode stage 104, while for each cycle the decode stage decodes instruction information received from the fetch stage 102 and provides the decoded instruction information to the next stage at the back end 105.

The fetch stage 102 and the decode stage 104 are shared stages, such that each stage can process instruction information for a different thread each cycle. To illustrate, for the example of FIG. 1 it is assumed that an operating system can schedule up to two threads, designated Thread A and Thread B, for execution at the instruction pipeline 101. The fetch stage 102 includes a set of Thread A registers 110 and a set of Thread B registers 111 which store state information for the corresponding thread. For example, the Thread A registers 110 can store pointer information indicating the next instruction to be fetched for Thread A while the Thread B registers 111 store pointer information indicating the next instruction to be fetched for Thread B. The fetch stage 102 also includes a fetch processing module 112 that each cycle selects, based on received thread selection information, one of the Thread A registers 110 and the Thread B registers 111, and uses the state information stored at the selected registers to fetch the next instruction for the corresponding thread. The selection of the registers and processing for a given thread is referred to herein as "scheduling" the thread for processing at the fetch stage 102.

Similar to the fetch stage 102, the decode stage 104 includes a set of Thread A registers 115 and a set of Thread B registers 116 which store state information for the corresponding thread. For example, the Thread A registers 115 can store received instruction information for Thread A while the Thread B registers 116 received instruction information for Thread B. The decode stage 104 further includes a decode processing module 117 that each cycle selects, based on received thread selection information, one of the Thread A registers 115 and the Thread B registers 116, decodes the instruction information stored at the selected registers, and provides the resulting decoded instructions to the back end 105.

To facilitate selection of the threads at the fetch stage 102 and the decode stage 104, the processor 100 includes thread selectors 118 and 119 and branch predictors 120 and 121. The branch predictors 120 and 121 are each configured to perform branch prediction for each thread executing at the instruction pipeline 101. In particular, the branch predictors 120 and 121 predict, based on patterns of branches taken by each thread or other execution information, which branches are predicted to be taken be each executing thread. Based on these predictions, the fetch stage 102 can speculatively fetch instructions for the predicted branches, improving throughput at the instruction pipeline 101. At a stage of the back end 105, the branch is resolved, whereby it the branch is either determined as taken or not taken, and the instruction pipeline 101 respectively either continues executing instructions of the thread (if the predicted branch is taken) or flushes the instructions of the branch from the pipeline and returning state information for the thread to an earlier, saved state (if the predicted branch is not taken).

The branch predictors 120 and 121 can employ any branch prediction technique, such as local branch prediction, global branch prediction, perceptron-based branch prediction, adaptive prediction, multi-level branch prediction, alloyed branch prediction, neural branch prediction, and the like. In some embodiments, the branch predictors 120 and 121 employ different branch prediction techniques. For example, the branch predictor 120 can use local branch prediction and the branch predictor 121 can use global branch prediction.

Based on the branch predictions generated by the branch predictors 120 and 121, the thread selector 118 determines a branch prediction confidence for each thread executing at the instruction pipeline 101. In some embodiments, the thread selector 118 sets the branch confidence level based on confidence values provided by the branch predictors 120 and 121. To illustrate using an example, for each branch prediction, the branch predictor 120 can supply a two bit value indicating a confidence level for the branch prediction, whereby the confidence level reflects the number of times the branch was actually taken by the corresponding thread. The thread selector 118 can use the two bit value to set the branch prediction confidence for the corresponding thread. In some embodiments, the branch prediction confidence has a smaller granularity than the confidence levels provided by the branch predictors 120 and 121. For example, based on a two bit confidence level provided by the branch predictor 120, the thread selector 118 can set a one bit value for the branch prediction confidence, indicating whether the confidence is "high" or "low."

In some embodiments, the thread selector 118 receives branch prediction information for each predicted branch of a thread from both branch predictors 120 and 121 and sets the branch prediction confidence level based on the degree of agreement between the received predictions. For example, in response to the branch predictors 120 and 121 both predicting that a branch of a thread is taken, the thread selector 118 can set the branch prediction confidence for the thread to a "high" setting and, in response to the branch predictors 120 and 121 disagreeing on whether a branch is taken, set the branch prediction confidence for the thread to a "low" setting.

In some embodiments, the processor 100 includes more than two branch predictors, and the thread selector 118 identifies the branch confidence for a thread based on whether the number of branch predictors that predict a particular branch exceeds a threshold. For example, the processor 100 can include 3 branch predictors, and the thread selector 118 can identify a thread as having a higher branch prediction confidence if at least two of the three branch predictors predict the same branch for the thread and identify the thread as having a lower branch prediction confidence if only one of the three branch predictors predicts a given branch for the thread.

In some scenarios, the branch predictors 120 and 121 issue a series of branch predictions for a thread whereby the predictions are issued before the first branch in the series is resolved as taken or not taken. Each branch prediction in the series is referred to as being dependent on the previous branch prediction in the series. In some embodiments, the thread selector 118 can adjust the branch prediction confidence for a thread based on the number of unresolved branch predictions in the series. For example, as each branch prediction is issued for a thread, the thread selector 118 can reduce the branch prediction confidence for the thread and increase the branch prediction confidence as branches are resolved at the instruction pipeline 101. Accordingly, threads having a larger number of unresolved predicted branches will have a lower branch prediction confidence, reflecting the lower likelihood that all the predicted dependent branches will be resolved as taken.

Each cycle, the thread selector 118 provides selection information to the fetch stage 102 to schedule a thread for processing at the stage during the next cycle, wherein the selection information is based on the relative branch prediction confidences for the executing threads and on a thread selection policy 125. The thread selection policy 125 defines the relationship between the relative branch prediction confidences for the executing threads and the frequency with which each thread is scheduled for processing at the fetch stage 102. For example, the thread selection policy 125 can define the relationship such that threads having an equal branch prediction confidence are scheduled for the same number of cycles, while a thread having a higher branch prediction confidence is scheduled for processing for twice the number of cycles as a thread having a lower branch prediction confidence.

The thread selector 119 determines branch prediction confidences for each executing thread in similar fashion to the thread selector 118, and provides thread selection information to the decode stage 104 based on the branch prediction confidences and on a thread selection policy 126. In some embodiments, the thread selection policy 126 differs from the thread selection policy 125, such that threads are scheduled differently at the fetch stage 102 and the decode stage 104.

Figure 2:
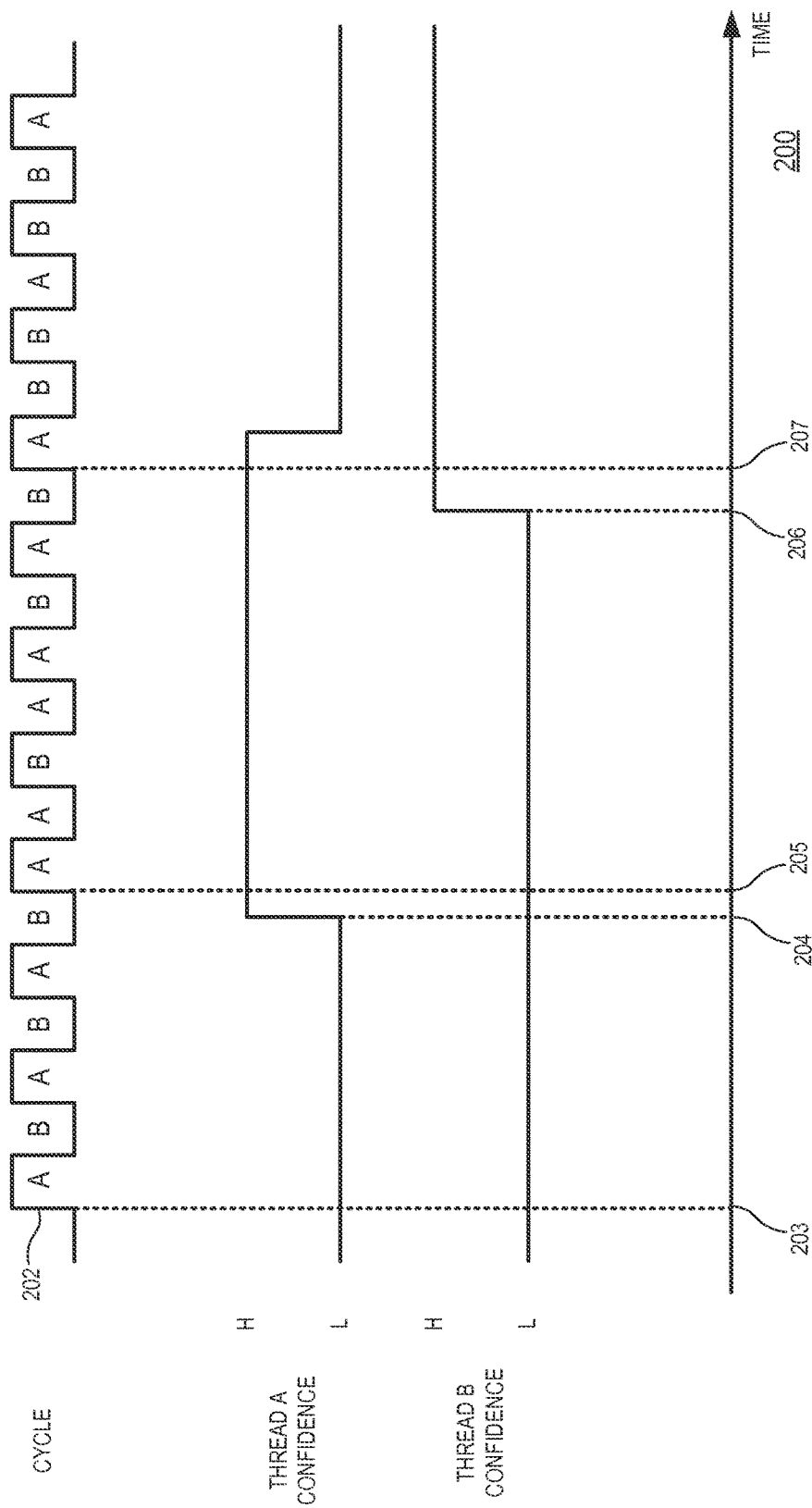
FIG. 2 is a diagram illustrating thread selection based on branch prediction confidence at the processor of FIG. 1 in accordance with some embodiments.

FIG. 2 illustrates a timeline 200 showing the scheduling of Thread A and Thread B at the fetch stage 102 in accordance with some embodiments. Waveform 202 illustrates a set of cycles of the instruction pipeline 101, with each cycle defined by consecutive edges of the waveform 202. The letter depicted in each cycle indicates the thread scheduled at the fetch stage 102 for that cycle.

In the illustrated example, the thread selector 118 determines that between times 203 and 205 Thread A and Thread B have equal branch prediction confidences. In particular, the branch prediction confidences for each thread are identified as having low ("L") branch prediction confidences. Accordingly, based on the thread selection policy 125, the thread selector 118 schedules Thread A and Thread B for processing at the fetch stage 102 in a round robin (alternating) fashion, such that the threads are scheduled for an equal number of cycles. At time 204, based on new branch prediction information received from the branch predictors 120 and 121, the thread selector 118 determines that the branch prediction confidence for Thread A has increased to a high ("H") level. In response, beginning at time 205, the thread selector 118 schedules Thread A for processing at the fetch stage for twice as many cycles as Thread B. Thus, because Thread A is providing instructions for processing that are predicted to be more likely to be doing useful work for the processor 100, Thread A is processed more often, thereby allocating resources of the instruction pipeline 101 more efficiently. At time 206, the thread selector 118 determines that the branch prediction confidence for Thread B has increased to the high level. Accordingly, because there is no longer any difference in the branch prediction confidences for Thread A and Thread B, at time 207 the thread selector 118 resumes scheduling Thread A and Thread B in a round robin fashion.

In some embodiments, the thread selector 118 can set the branch prediction confidence for each thread at a level of granularity greater than two, and the thread selection policy 125 can define corresponding thread scheduling frequencies.

Figure 3:
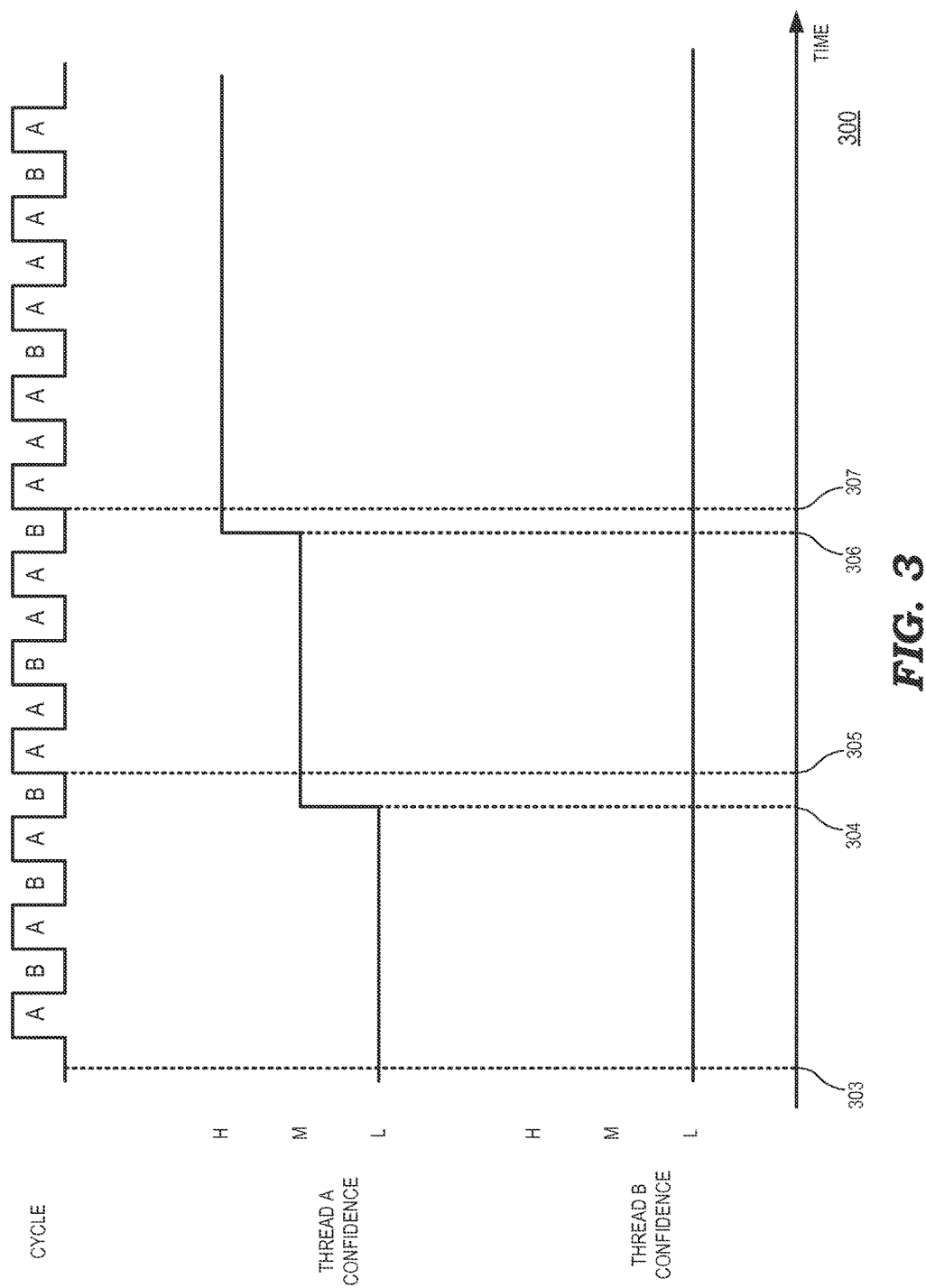
FIG. 3 is a diagram illustrating thread selection based on branch prediction confidence at the processor of FIG. 1 in accordance with some embodiments.
Figure 4:
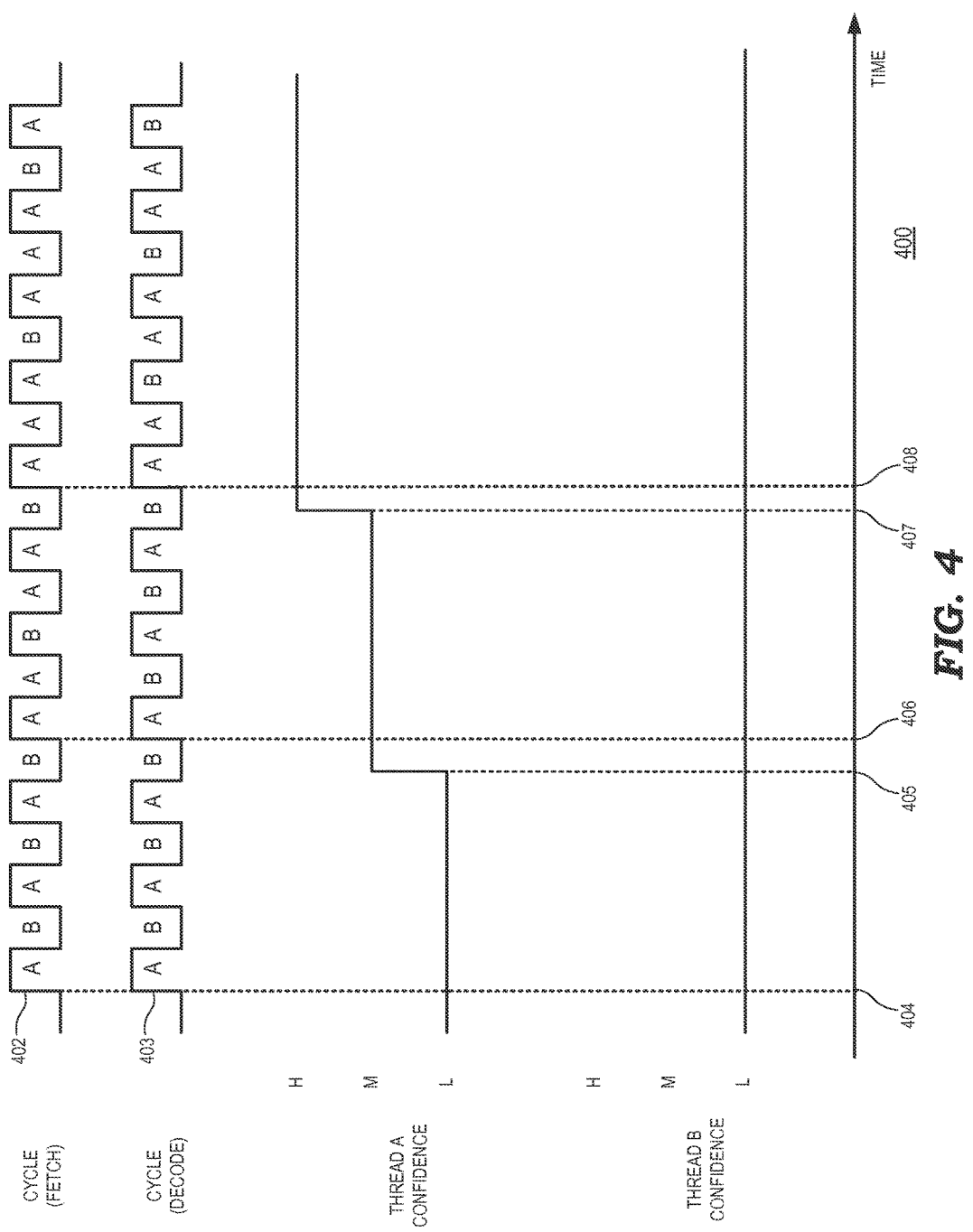
FIG. 4 is a diagram illustrating thread selection based on branch prediction confidence at the processor of FIG. 1 in accordance with some embodiments.

An example of such a scenario is illustrated by the timeline 300 of FIG. 3 in accordance with some embodiments. In the illustrated example, the thread selector can set, based on branch predictions from the branch predictors 120 and 121, the branch prediction confidence for Thread A and Thread B to any one of three levels: high ("H"), medium ("M"), or low ("L"). At time 303, the thread selector 118 has set the branch prediction confidence for both Thread A and Thread B to the low level. Accordingly, based on the thread selection policy 125, the thread selector 118 schedules Thread A and Thread B for processing at the fetch stage 102 in a round robin fashion. At time 304, based on new branch predictions from the branch predictors 120 and 121, the thread selector 118 sets the branch prediction confidence for Thread A to the medium level, while the branch prediction confidence for Thread B remains at the low level. In response, at time 305 the thread selector 118 begins scheduling Thread A for processing at the fetch stage 102 for twice as many cycles as Thread B, as mandated by the thread selection policy 125.

At time 306, based on new branch predictions from the branch predictors 120 and 121, the thread selector 118 sets the branch prediction confidence for Thread A to the high level, while the branch prediction confidence for Thread B remains at the low level. In response to the increased difference in the branch prediction confidences for the threads, at time 307 the thread selector 118 begins scheduling Thread A for processing at the fetch stage 102 for three times as many cycles as Thread B, as mandated by the thread selection policy 125. Thus, as the difference in branch prediction confidences for the threads grows larger, the thread selector increases the number of cycles assigned to threads having higher branch prediction confidences, thereby assigning processor resources more efficiently.

In some embodiments, the thread selection policies 125 and 126 define different relationships between branch prediction confidences and the frequency with which each thread is scheduled at the fetch stage 102 and the decode stage 104, respectively. An example of such a scenario is illustrated by the timeline 400 of FIG. 4 in accordance with some embodiments. Waveform 402 of the timeline 400 illustrates which thread is scheduled at the fetch stage 102 for a set of cycles of the instruction pipeline 101, while waveform 403 illustrates which thread is scheduled at the decode stage 104 for the same set of cycles. At time 404, the thread selectors 118 and 119 identify the branch prediction confidences for both Thread A and Thread B to be at the low level. Accordingly, based on thread selection policy 125, the thread selector 118 schedules Thread A and Thread B for processing at the fetch stage 102 in a round robin fashion. The thread selector 119 schedules Thread A and Thread B in a similar round robin fashion based on thread selection policy 126.

At time 405, the thread selectors 118 and 119 identify, based on new branch predictions from the branch predictors 120 and 121, that the branch prediction confidence for Thread A has increased to the medium level. The thread selector 118 determines that thread selection policy 125 mandates increased scheduling for Thread A when there is a one level difference in the branch prediction confidences for Thread A and Thread B. Accordingly, at time 406 the thread selector 118 begins scheduling Thread A for processing at the fetch stage 102 twice as often as Thread B. However, thread selection policy 126 indicates that a one level difference in the branch prediction confidences for Thread A and Thread B does not require increased scheduling for the higher confidence thread. Accordingly, at time 406 thread selector 119 continues scheduling Thread A and Thread B for processing at the decode stage 104 in a round robin fashion.

At time 407 the thread selectors 118 and 119 identify, based on new branch predictions from the branch predictors 120 and 121, that the branch prediction confidence for Thread A has increased to the high level and the branch prediction confidence for Thread B remains at the low level. The thread selector 118 determines that thread selection policy 125 mandates increased scheduling for Thread A when there is a two level difference in the branch prediction confidences for Thread A and Thread B. Accordingly, at time 408 the thread selector 118 begins scheduling Thread A for processing at the fetch stage 102 three as often as Thread B. Thread selection policy 126 indicates that a two level difference in the branch prediction confidences for Thread A and Thread B also requires increased scheduling for the higher confidence thread. Accordingly, at time 408 thread selector 119 begins scheduling Thread A for processing at the decode stage 104 twice as often as Thread B.

Figure 5:
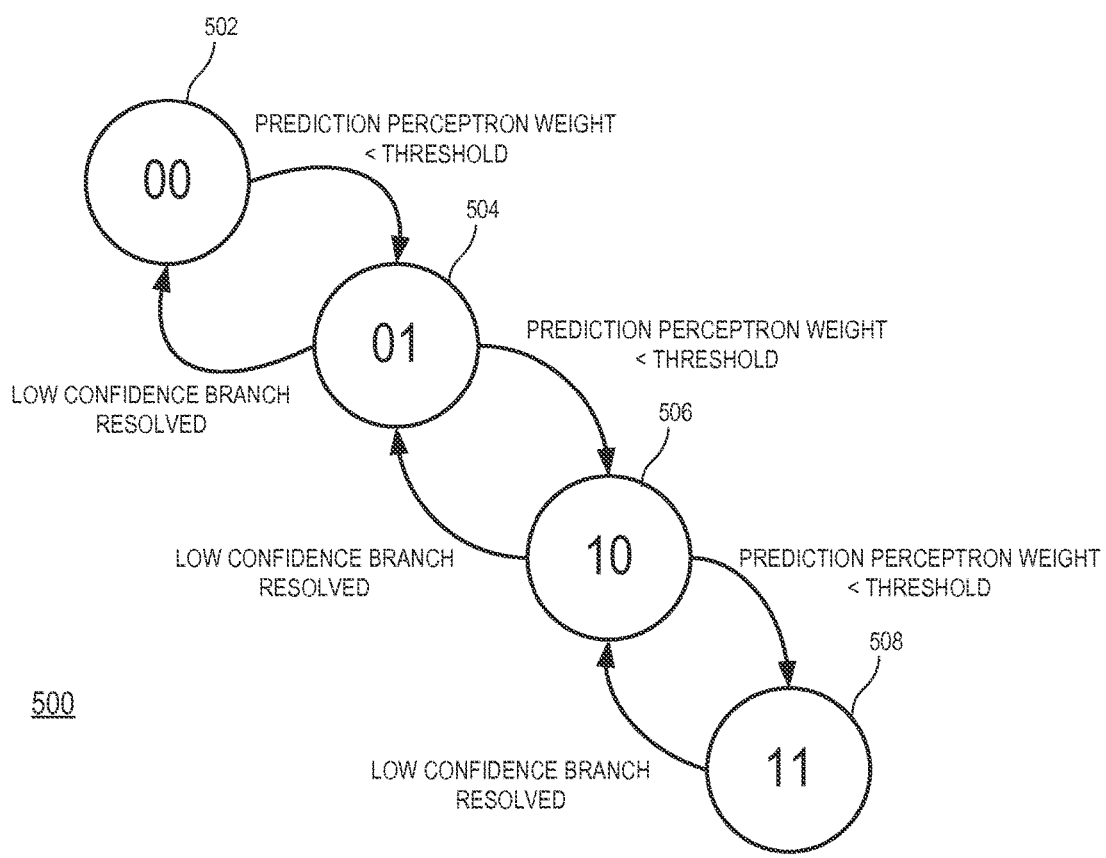
FIG. 5 is state diagram of a method of determining branch prediction confidence in accordance with some embodiments.

FIG. 5 illustrates a state diagram 500 showing an example of how thread selector 118 can adjust the branch prediction confidence for a thread based on branch prediction information received from the branch predictor 120. In the illustrated example, for each branch prediction for the thread, the branch predictor 120 provides a perceptron weight indicating the branch predictor's confidence that the corresponding branch will be taken. The thread selector 118 compares the received weights to a threshold, and adjusts its state accordingly.

To illustrate, state diagram 500 includes states 502, 504, 506, and 508 (states 502-508). Each state is associated with a value, depicted inside the circle representing the corresponding state. The value for a state represents the branch prediction confidence for the thread when the thread selector is in the corresponding state, with lower values representing a higher branch prediction confidence. The thread selector 118 begins in state 502, with the branch prediction confidence for the thread set to its highest level (value 00). In response to receiving a branch prediction from the branch predictor 120, the thread selector 118 compares the perceptron value for the branch prediction to a threshold. If the perceptron value is greater than the threshold, thread selector 118 remains in state 502. If the perceptron value is lower than the threshold, the thread selector 118 moves to state 504 and the branch prediction confidence for the thread is lowered (value increased to 01).

In state 504, if the thread selector 118 receives an indication that a low-confidence branch prediction (a branch prediction having a perceptron value lower than the threshold) has been resolved at the instruction pipeline 101, the thread selector 118 returns to state 502 and increases the branch prediction confidence for the thread. If, at state 504, the thread selector 118 receives a branch prediction with a perceptron value greater than the threshold, it remains at state 504. If the perceptron value is less than the threshold, the thread selector 118 moves to state 506 and lowers the branch prediction confidence for the thread (value increased to 10).

In state 506, if the thread selector 118 receives an indication that a low-confidence branch prediction has been resolved at the instruction pipeline 101, the thread selector 118 returns to state 504 and increases the branch prediction confidence for the thread. If, at state 506, the thread selector 118 receives a branch prediction with a perceptron value greater than the threshold, it remains at state 506. If the perceptron value is less than the threshold, the thread selector 118 moves to state 508 and lowers the branch prediction confidence for the thread (value increased to 11).

In state 508, if the thread selector 118 receives an indication that a low-confidence branch prediction (a branch prediction having a perceptron value lower than the threshold) has been resolved at the instruction pipeline 101, the thread selector 118 returns to state 506 and increases the branch prediction confidence for the thread. In state 508, the branch prediction confidence for the thread is at its lowest level. Accordingly if, at state 508, the thread selector 118 receives a branch prediction it remains at state 508.

Figure 6:
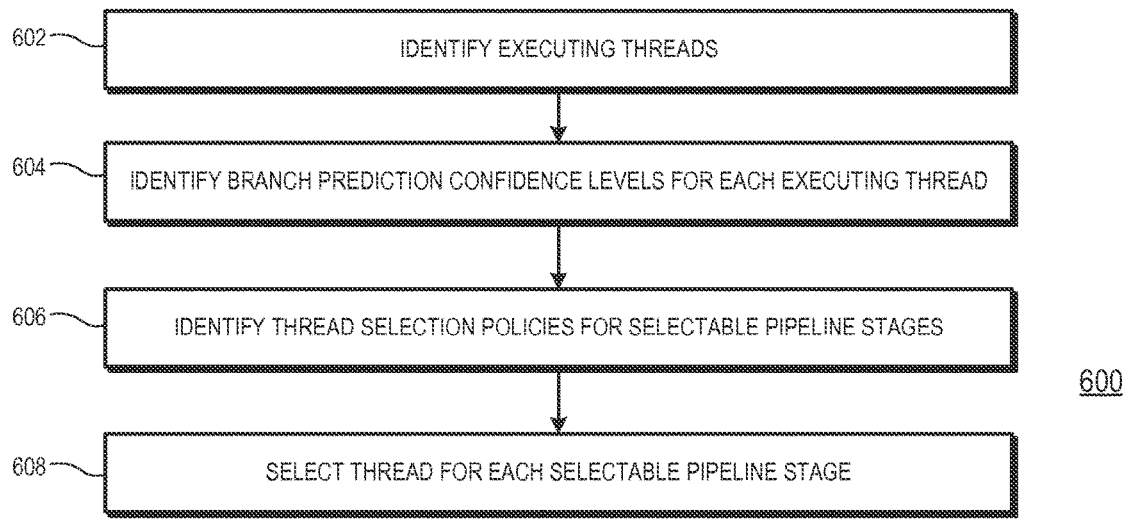
FIG. 6 is flow diagram of a method of selecting threads for execution at a processor based on branch prediction confidence in accordance with some embodiments.

FIG. 6 depicts a flow diagram of a method 600 of scheduling threads at an instruction pipeline based on branch prediction confidence. For purposes of illustration, the method 600 is described with respect to an example implementation at the processor 100 of FIG. 1. At block 602, the thread selectors 118 and 119 identify, based on information received from, for example, an operating system, which threads are being executed at the instruction pipeline 101. At block 604, the thread selectors 118 and 119 each identify, based on branch predictions received from the branch predictors 120 and 121, the branch prediction confidences for the executing threads. At block 606 the thread selectors 118 and 119 each identify the thread selection policies for the corresponding instruction pipeline stage, as indicated by thread selection policies 125 and 126, respectively. At block 608 the thread selectors 118 and 119 select threads for execution at the fetch stage 102 and the decode stage 104, respectively, based on the thread confidences for each executing thread and based on the corresponding thread selection policies.

In some embodiments, the apparatus and techniques described above are implemented in a system comprising one or more integrated circuit (IC) devices (also referred to as integrated circuit packages or microchips), such as the processor described above with reference to FIGS. 1-6. Electronic design automation (EDA) and computer aided design (CAD) software tools may be used in the design and fabrication of these IC devices. These design tools typically are represented as one or more software programs. The one or more software programs comprise code executable by a computer system to manipulate the computer system to operate on code representative of circuitry of one or more IC devices so as to perform at least a portion of a process to design or adapt a manufacturing system to fabricate the circuitry. This code can include instructions, data, or a combination of instructions and data. The software instructions representing a design tool or fabrication tool typically are stored in a computer readable storage medium accessible to the computing system. Likewise, the code representative of one or more phases of the design or fabrication of an IC device may be stored in and accessed from the same computer readable storage medium or a different computer readable storage medium.

A computer readable storage medium may include any storage medium, or combination of storage media, accessible by a computer system during use to provide instructions and/or data to the computer system. Such storage media can include, but is not limited to, optical media (e.g., compact disc (CD), digital versatile disc (DVD), Blu-Ray disc), magnetic media (e.g., floppy disc, magnetic tape, or magnetic hard drive), volatile memory (e.g., random access memory (RAM) or cache), non-volatile memory (e.g., read-only memory (ROM) or Flash memory), or microelectromechanical systems (MEMS)-based storage media. The computer readable storage medium may be embedded in the computing system (e.g., system RAM or ROM), fixedly attached to the computing system (e.g., a magnetic hard drive), removably attached to the computing system (e.g., an optical disc or Universal Serial Bus (USB)-based Flash memory), or coupled to the computer system via a wired or wireless network (e.g., network accessible storage (NAS)).

Figure 7:
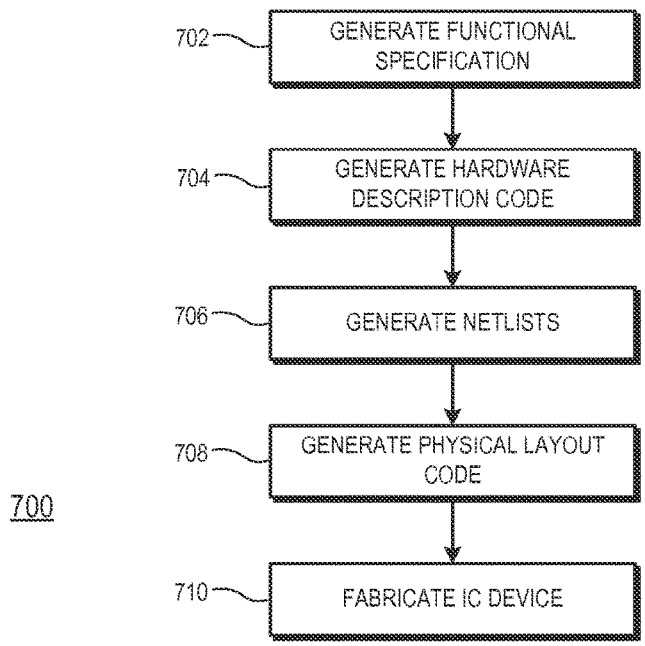
FIG. 7 is a flow diagram illustrating a method for designing and fabricating an integrated circuit device implementing at least a portion of a component of a processing system in accordance with some embodiments.

FIG. 7 is a flow diagram illustrating an example method 700 for the design and fabrication of an IC device implementing one or more aspects in accordance with some embodiments. As noted above, the code generated for each of the following processes is stored or otherwise embodied in computer readable storage media for access and use by the corresponding design tool or fabrication tool.

At block 702 a functional specification for the IC device is generated. The functional specification (often referred to as a micro architecture specification (MAS)) may be represented by any of a variety of programming languages or modeling languages, including C, C++, SystemC, Simulink, or MATLAB.

At block 704, the functional specification is used to generate hardware description code representative of the hardware of the IC device. In some embodiments, the hardware description code is represented using at least one Hardware Description Language (HDL), which comprises any of a variety of computer languages, specification languages, or modeling languages for the formal description and design of the circuits of the IC device. The generated HDL code typically represents the operation of the circuits of the IC device, the design and organization of the circuits, and tests to verify correct operation of the IC device through simulation. Examples of HDL include Analog HDL (AHDL), Verilog HDL, SystemVerilog HDL, and VHDL. For IC devices implementing synchronized digital circuits, the hardware descriptor code may include register transfer level (RTL) code to provide an abstract representation of the operations of the synchronous digital circuits. For other types of circuitry, the hardware descriptor code may include behavior-level code to provide an abstract representation of the circuitry's operation. The HDL model represented by the hardware description code typically is subjected to one or more rounds of simulation and debugging to pass design verification.

After verifying the design represented by the hardware description code, at block 706 a synthesis tool is used to synthesize the hardware description code to generate code representing or defining an initial physical implementation of the circuitry of the IC device. In some embodiments, the synthesis tool generates one or more netlists comprising circuit device instances (e.g., gates, transistors, resistors, capacitors, inductors, diodes, etc.) and the nets, or connections, between the circuit device instances. Alternatively, all or a portion of a netlist can be generated manually without the use of a synthesis tool. As with the hardware description code, the netlists may be subjected to one or more test and verification processes before a final set of one or more netlists is generated.

Alternatively, a schematic editor tool can be used to draft a schematic of circuitry of the IC device and a schematic capture tool then may be used to capture the resulting circuit diagram and to generate one or more netlists (stored on a computer readable media) representing the components and connectivity of the circuit diagram. The captured circuit diagram may then be subjected to one or more rounds of simulation for testing and verification.

At block 708, one or more EDA tools use the netlists produced at block 706 to generate code representing the physical layout of the circuitry of the IC device. This process can include, for example, a placement tool using the netlists to determine or fix the location of each element of the circuitry of the IC device. Further, a routing tool builds on the placement process to add and route the wires needed to connect the circuit elements in accordance with the netlist (s). The resulting code represents a three-dimensional model of the IC device. The code may be represented in a database file format, such as, for example, the Graphic Database System II (GDSII) format. Data in this format typically represents geometric shapes, text labels, and other information about the circuit layout in hierarchical form.

At block 710, the physical layout code (e.g., GDSII code) is provided to a manufacturing facility, which uses the physical layout code to configure or otherwise adapt fabrication tools of the manufacturing facility (e.g., through mask works) to fabricate the IC device. That is, the physical layout code may be programmed into one or more computer systems, which may then control, in whole or part, the operation of the tools of the manufacturing facility or the manufacturing operations performed therein.

In some embodiments, certain aspects of the techniques described above may implemented by one or more processors of a processing system executing software. The software comprises one or more sets of executable instructions stored on a computer readable medium that, when executed by the one or more processors, manipulate the one or more processors to perform one or more aspects of the techniques described above. The software is stored or otherwise tangibly embodied on a computer readable storage medium accessible to the processing system, and can include the instructions and certain data utilized during the execution of the instructions to perform the corresponding aspects.

As disclosed herein, in some embodiments a method includes selecting one of a first thread and a second thread for processing at a first stage of an instruction pipeline of a processor based on a first branch prediction confidence for the first thread and a second branch prediction confidence for the second thread. In some aspects, the method includes The method of claim 1, further comprising identifying the first branch prediction confidence based on a relationship between a branch confidence level associated with a first branch prediction and a threshold. In some aspects the method includes decreasing the first branch prediction confidence in response to receiving an indication that a confidence level associated with the prediction of a branch is below a threshold. In some aspects the method includes increasing the first branch prediction confidence in response to receiving an indication that the prediction of the branch has been resolved. In some aspects the method includes determining a first branch prediction for the first thread based on a first branch prediction technique; determining a second branch prediction for the first thread based on a second branch prediction technique different from the second branch prediction technique; and identifying the first branch prediction confidence as one of a high confidence or a low confidence based on whether the first branch prediction matches the second branch prediction. In some aspects the method includes determining a plurality of branch predictions for the first thread based on a plurality of branch prediction techniques; and identifying the first branch prediction confidence based on a number of the plurality of branch predictions that predict a first branch is taken exceeding a threshold. In some aspects the method includes identifying the first branch prediction confidence based on a number of predicted branches for the first thread. In some aspects the method includes selecting the other of the first thread and the second thread for processing at a second stage of the instruction pipeline based on the first branch prediction confidence for the first thread and the second branch prediction confidence for the second thread. In some aspects the method includes selecting one of the first thread and the second thread for processing at the first stage comprises selecting one of the first thread and the second thread based on a first selection policy that defines a first relationship between the first branch prediction confidence and the second branch prediction confidence; and selecting the other of the first thread and the second thread for processing at the second stage comprises selecting the other of the first thread and the second thread based on a second selection policy that defines a second relationship between the first branch prediction confidence and the second branch prediction confidence, the second relationship different from the first relationship.

In some embodiments a method includes selecting between a first thread and a second thread for execution at a first stage of a processor based on a first branch prediction confidence for the first thread and a second branch prediction confidence for the second thread, the selecting comprising: during a first amount of time, selecting the first thread to execute for a first number of cycles based on the first branch prediction confidence; and during a second amount of time equal to the first amount of time, selecting the first thread to execute for a second number of cycles different from the first number of cycles. In some aspects the selecting further comprises: during a third amount of time equal to the second amount of time, selecting the first thread to execute for a third number of cycles different from the first number of cycles and the second number of cycles. In some aspects selecting the first thread to execute for the first number of cycles comprises selecting the first thread to execute for the first number of cycles based on the first branch prediction confidence matching the second branch prediction confidence; and selecting the first thread to execute for the second number of cycles comprises selecting the first thread to execute for the second number of cycles based on the first branch prediction confidence exceeding the second branch prediction confidence.

In some embodiments, a processor includes an instruction pipeline including a first stage; a first branch predictor to predict branches at the instruction pipeline; and a thread selector to select one of a first thread and a second thread for processing at the first stage of the instruction pipeline based on a first branch prediction confidence for the first thread and a second branch prediction confidence for the second thread, the first branch prediction confidence and the second branch prediction confidence based on branch prediction from the first branch predictor. In some aspects the thread selector identifies the first branch prediction confidence based on a relationship between a branch confidence level associated with a first branch prediction and a threshold. In some aspects the thread selector is to: decrease the first branch prediction confidence in response to receiving an indication that a confidence level associated with the prediction of a branch is below a threshold. In some aspects the thread selector is to: increase the first branch prediction confidence in response to receiving an indication that the prediction of the branch has been resolved. In some aspects the processor includes a second branch predictor, the first branch predictor to use a first branch prediction technique and the second branch predictor to use a second branch prediction technique different from the first branch prediction technique; and wherein the thread selector is to identify the first branch prediction confidence as one of a high confidence or a low confidence based on whether the branch predictions from the first branch predictor matches branch predictions from the second branch predictor. In some aspects the processor includes a plurality of branch predictors including the first branch predictor; and wherein the thread selector is to identify the first branch prediction confidence based on a number of matching branch predictions from the plurality of branch predictors exceeding a threshold. In some aspects the thread selector is to identify the first branch prediction confidence based on a number of predicted branches for the first thread.

In some embodiments, a computer readable medium stores code to adapt at least one computer system to perform a portion of a process to fabricate at least part of a processor, the processor including: an instruction pipeline including a first stage; a first branch predictor to predict branches at the instruction pipeline; and a thread selector to select one of a first thread and a second thread for processing at the first stage of the instruction pipeline based on a first branch prediction confidence for the first thread and a second branch prediction confidence for the second thread, the first branch prediction confidence and the second branch prediction confidence based on branch prediction from the first branch predictor. In some aspects the thread selector identifies the first branch prediction confidence based on a relationship between a branch confidence level associated with a first branch prediction and a threshold. In some aspects the thread selector is to: decrease the first branch prediction confidence in response to receiving an indication that a confidence level associated with the prediction of a branch is below a threshold. In some aspects the thread selector is to: increase the first branch prediction confidence in response to receiving an indication that the prediction of the branch has been resolved. In some aspects the processor includes: a second branch predictor, the first branch predictor to use a first branch prediction technique and the second branch predictor to use a second branch prediction technique different from the first branch prediction technique; and wherein the thread selector is to identify the first branch prediction confidence as one of a high confidence or a low confidence based on whether the branch predictions from the first branch predictor matches branch predictions from the second branch predictor. In some aspects the processor further includes: a plurality of branch predictors including the first branch predictor; and wherein the thread selector is to identify the first branch prediction confidence based on a number of matching branch predictions from the plurality of branch predictors exceeding a threshold.

Note that not all of the activities or elements described above in the general description are required, that a portion of a specific activity or device may not be required, and that one or more further activities may be performed, or elements included, in addition to those described. Still further, the order in which activities are listed are not necessarily the order in which they are performed.

Also, the concepts have been described with reference to specific embodiments. However, one of ordinary skill in the art appreciates that various modifications and changes can be made without departing from the scope of the present disclosure as set forth in the claims below. Accordingly, the specification and figures are to be regarded in an illustrative rather than a restrictive sense, and all such modifications are intended to be included within the scope of the present disclosure.

Benefits, other advantages, and solutions to problems have been described above with regard to specific embodiments. However, the benefits, advantages, solutions to problems, and any feature(s) that may cause any benefit, advantage, or solution to occur or become more pronounced are not to be construed as a critical, required, or essential feature of any or all the claims.

What is claimed is:

1. A method, comprising:
   determining a first branch prediction for a first thread based on a first branch prediction technique;
   determining a second branch prediction for the first thread based on a second branch prediction technique different from the first branch prediction technique;
   identifying a first branch prediction confidence for the first thread as one of a high confidence or a low confidence based on whether the first branch prediction matches the second branch prediction; and
   selecting one of the first thread and a second thread for processing at a first stage of an instruction pipeline of a processor based on the first branch prediction confidence for the first thread and a second branch prediction confidence for the second thread, the processor prioritizing the thread having the higher of the first and second branch prediction confidence.

2. The method of claim 1, further comprising identifying the first branch prediction confidence based on a relationship between a branch confidence level associated with a first branch prediction and a threshold.

3. The method of claim 1, further comprising:
   decreasing the first branch prediction confidence in response to receiving an indication that a confidence level associated with the prediction of a branch is below a threshold.

4. The method of claim 3, further comprising:
   increasing the first branch prediction confidence in response to receiving an indication that the prediction of the branch has been resolved.

5. The method of claim 1, further comprising:
   determining a plurality of branch predictions for the first thread based on a plurality of branch prediction techniques; and
   identifying the first branch prediction confidence based on a number of the plurality of branch predictions that predict a first branch is taken exceeding a threshold.

6. The method of claim 1, further comprising:
   identifying the first branch prediction confidence based on a number of predicted branches for the first thread.

7. The method of claim 1, further comprising:
   selecting the other of the first thread and the second thread for processing at a second stage of the instruction pipeline based on the first branch prediction confidence for the first thread and the second branch prediction confidence for the second thread.

8. The method of claim 7, wherein:
   selecting one of the first thread and the second thread for processing at the first stage comprises selecting one of the first thread and the second thread based on a first selection policy that defines a first relationship between the first branch prediction confidence and the second branch prediction confidence; and
   selecting the other of the first thread and the second thread for processing at the second stage comprises selecting the other of the first thread and the second thread based on a second selection policy that defines a second relationship between the first branch prediction confidence and the second branch prediction confidence, the second relationship different from the first relationship.

9. A method, comprising:
   selecting between a first thread and a second thread for execution at a first stage of a processor based on a first branch prediction confidence for the first thread based on first branch prediction technique and a second branch prediction confidence for the second thread based on a second branch prediction technique different from the first branch prediction technique, the processor identifying a first branch prediction confidence for the first thread as one of a high confidence or a low confidence based on whether the first branch prediction matches the second branch prediction, and the processor prioritizing the thread having the higher of the first and second branch prediction confidence, the selecting comprising:
   during a first amount of time, selecting the first thread to execute for a first number of cycles based on the first branch prediction confidence; and
   during a second amount of time equal to the first amount of time, selecting the first thread to execute for a second number of cycles different from the first number of cycles.

10. The method of claim 9, wherein the selecting further comprises:
    during a third amount of time equal to the second amount of time, selecting the first thread to execute for a third number of cycles different from the first number of cycles and the second number of cycles.

11. The method of claim 9, wherein:
    selecting the first thread to execute for the first number of cycles comprises selecting the first thread to execute for the first number of cycles based on the first branch prediction confidence matching the second branch prediction confidence; and
    selecting the first thread to execute for the second number of cycles comprises selecting the first thread to execute for the second number of cycles based on the first branch prediction confidence exceeding the second branch prediction confidence.

12. A processor, comprising:
    an instruction pipeline including a first stage;
    a first branch predictor and a second branch predictor to predict branches at the instruction pipeline, the first branch predictor to use a first branch prediction technique and the second branch predictor to use a second branch prediction technique different from the first branch prediction technique; and
    a thread selector to select one of a first thread and a second thread for processing at the first stage of the instruction pipeline based on a first branch prediction confidence for the first thread and a second branch prediction confidence for the second thread, the first branch prediction confidence and the second branch prediction confidence based on branch prediction from the first branch predictor, wherein the thread selector is to identify the first branch prediction confidence as one of a high confidence or a low confidence based on whether the branch predictions from the first branch predictor matches branch predictions from the second branch predictor, and further wherein the thread selector prioritizes the thread having the higher of the first and second branch prediction confidence.

13. The processor of claim 12, wherein the thread selector identifies the first branch prediction confidence based on a relationship between a branch confidence level associated with a first branch prediction and a threshold.

14. The processor of claim 12, wherein the thread selector is to:

decrease the first branch prediction confidence in response to receiving an indication that a confidence level associated with the prediction of a branch is below a threshold.

15. The processor of claim 14, wherein the thread selector is to:
increase the first branch prediction confidence in response to receiving an indication that the prediction of the branch has been resolved.

16. The processor of claim 12, further comprising:
a plurality of branch predictors including the first branch predictor; and
wherein the thread selector is to identify the first branch prediction confidence based on a number of matching branch predictions from the plurality of branch predictors exceeding a threshold.

17. The processor of claim 12, wherein the thread selector is to identify the first branch prediction confidence based on a number of predicted branches for the first thread.

18. A non-transitory computer readable medium storing code to adapt at least one computer system to perform a portion of a process to fabricate at least part of a processor, the processor comprising:
an instruction pipeline including a first stage;
a first branch predictor and a second branch predictor to predict branches at the instruction pipeline, the first branch predictor to use a first branch prediction technique and the second branch predictor to use a second branch prediction technique different from the first branch prediction technique; and
a thread selector to select one of a first thread and a second thread for processing at the first stage of the instruction pipeline based on a first branch prediction confidence for the first thread and a second branch prediction confidence for the second thread, the first branch prediction confidence and the second branch prediction confidence based on branch prediction from the first branch predictor, wherein the thread selector is to identify the first branch prediction confidence as one of a high confidence or a low confidence based on whether the branch predictions from the first branch predictor matches branch predictions from the second branch predictor, and further wherein the thread selector prioritizes the thread having the higher of the first and second branch prediction confidence.

19. The computer readable medium of claim 18, wherein the thread selector identifies the first branch prediction confidence based on a relationship between a branch confidence level associated with a first branch prediction and a threshold.

20. The computer readable medium of claim 18, wherein the thread selector is to:
decrease the first branch prediction confidence in response to receiving an indication that a confidence level associated with the prediction of a branch is below a threshold.

21. The computer readable medium of claim 18, wherein the thread selector is to:
increase the first branch prediction confidence in response to receiving an indication that the prediction of the branch has been resolved.

22. The computer readable medium of claim 18, the processor further comprising:
a plurality of branch predictors including the first branch predictor; and
wherein the thread selector is to identify the first branch prediction confidence based on a number of matching branch predictions from the plurality of branch predictors exceeding a threshold.

* * * * *